May 18, 1948.　　A. O. TAYLOR　　2,441,913
CARGO AIRPLANE
Filed Nov. 7, 1944　　5 Sheets-Sheet 1
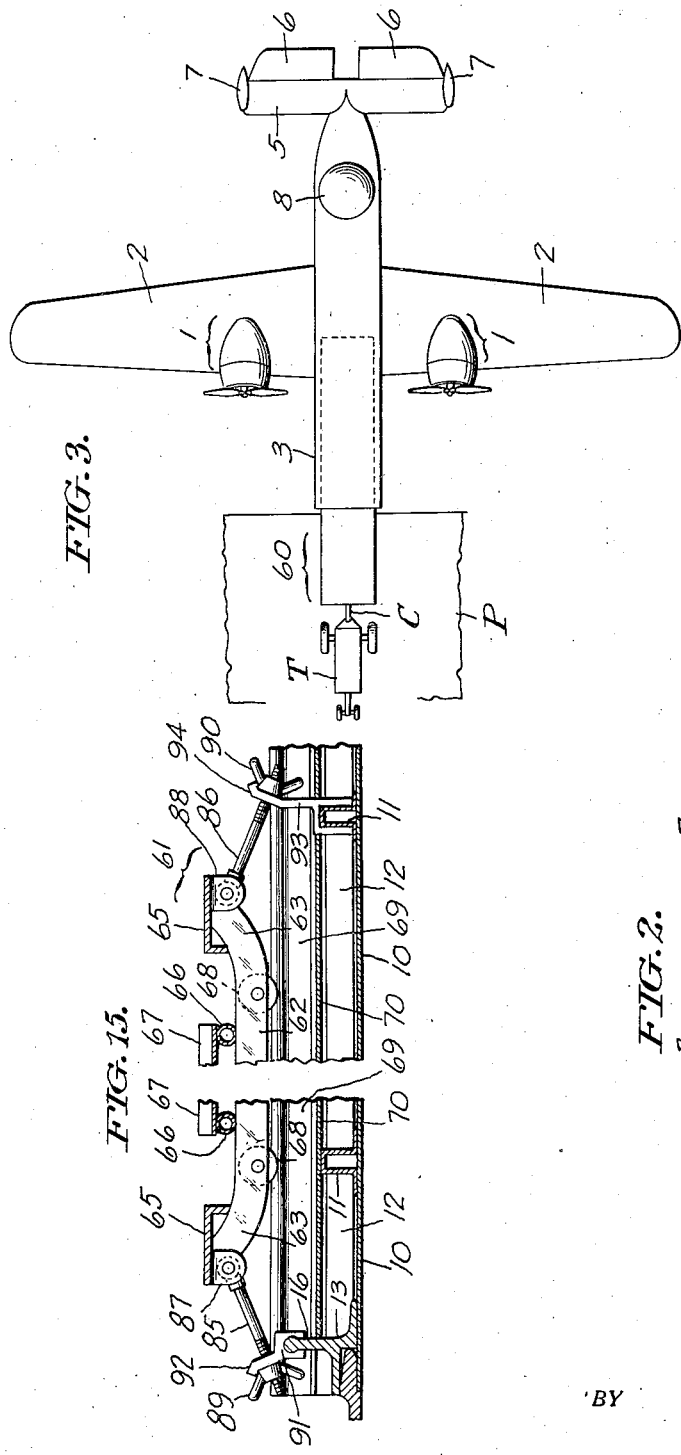
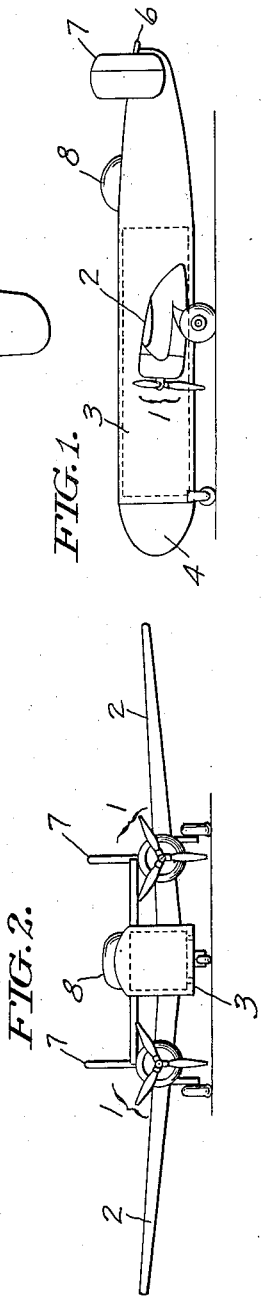
INVENTOR:
Alanson O. Taylor,
BY Paul & Paul
ATTORNEYS.

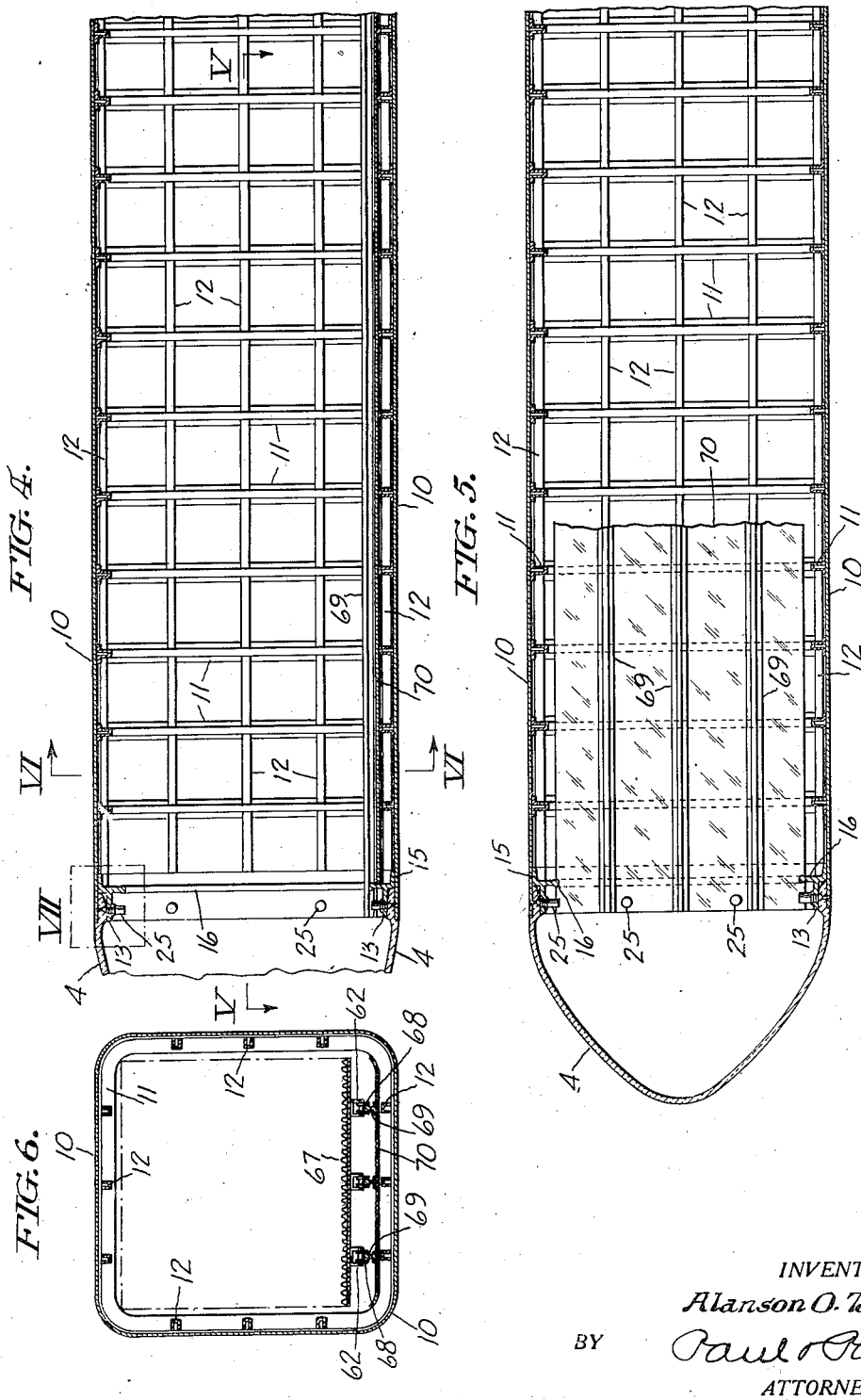

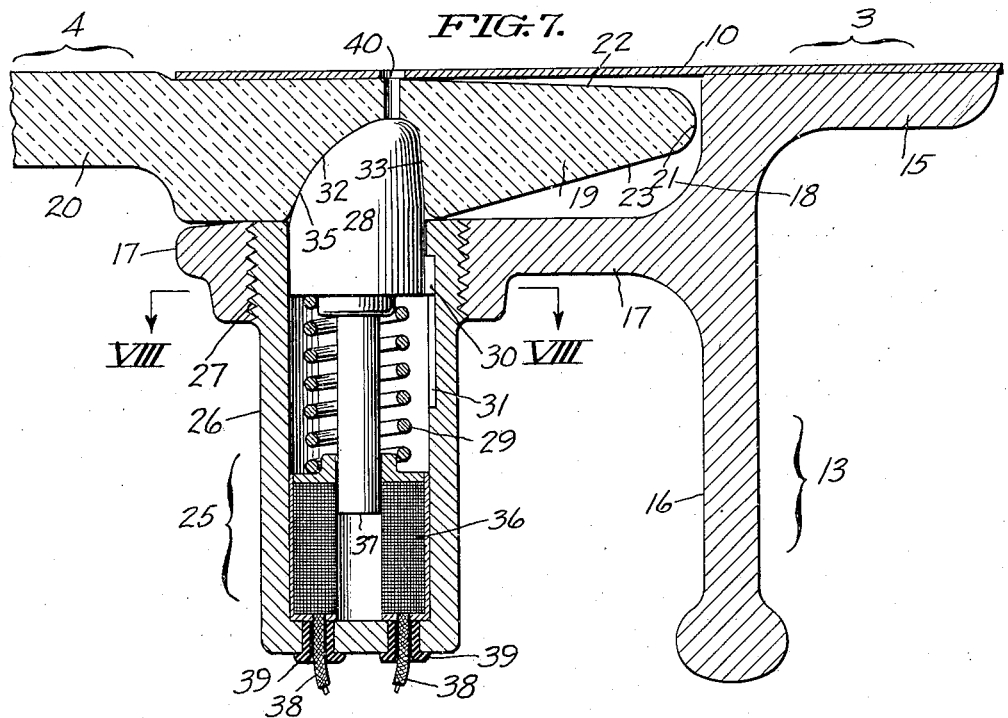
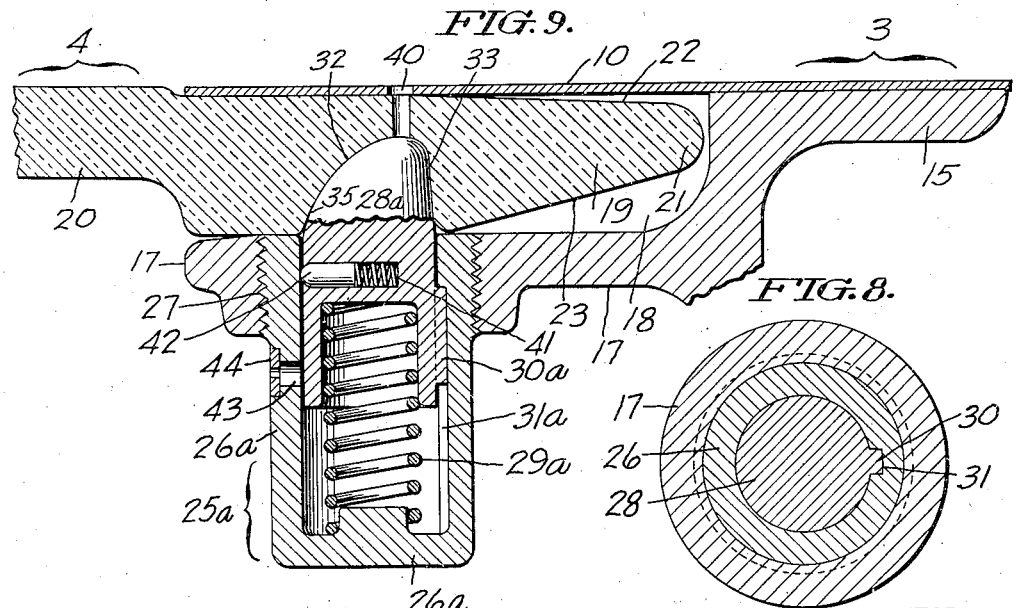

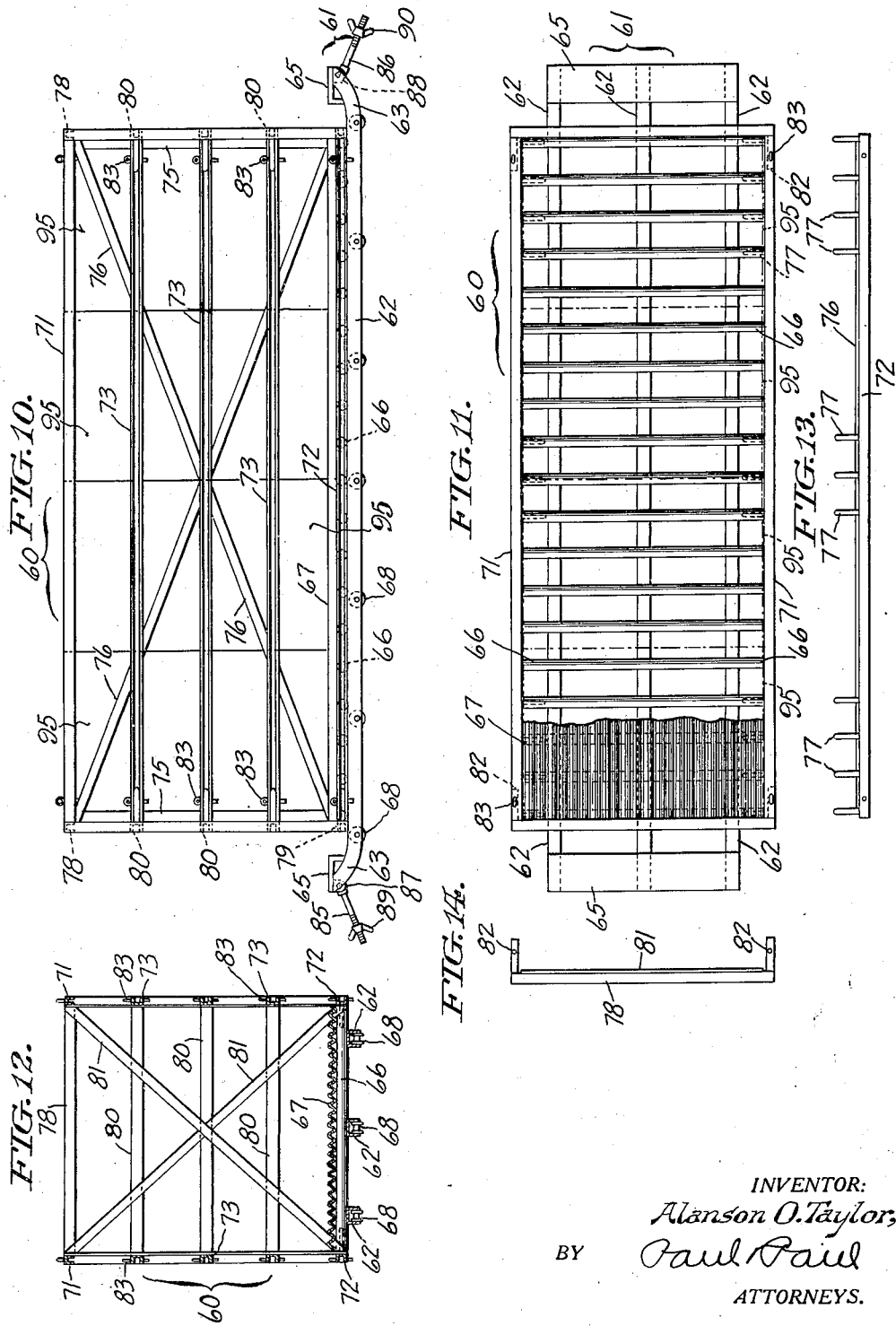

May 18, 1948. A. O. TAYLOR 2,441,913
CARGO AIRPLANE
Filed Nov. 7, 1944 5 Sheets-Sheet 5
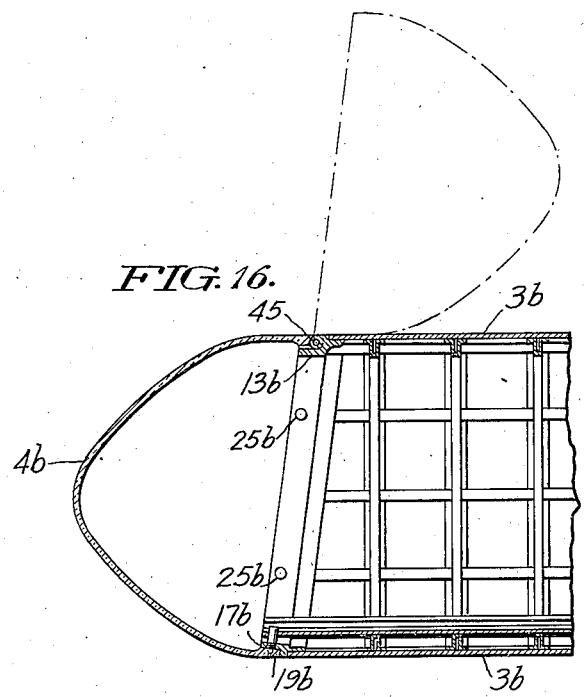
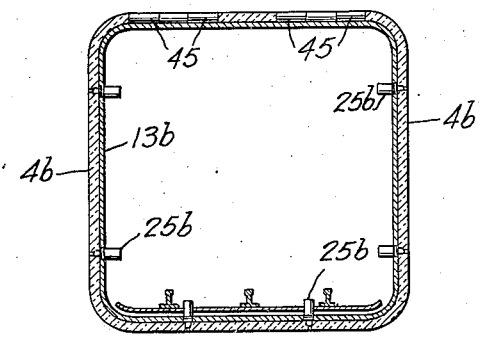
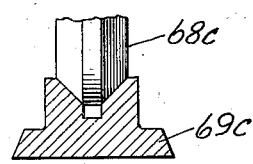
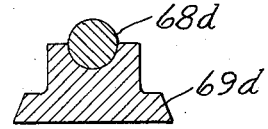
INVENTOR:
Alanson O. Taylor,
BY Paul & Paul
ATTORNEYS.

Patented May 18, 1948

2,441,913

UNITED STATES PATENT OFFICE 2,441,913

CARGO AIRPLANE

Alanson O. Taylor, Lansdowne, Pa.

Application November 7, 1944, Serial No. 562,285

10 Claims. (Cl. 244—118)

1

This invention relates to air craft designed for cargo transport. More specifically, it is concerned with cargo planes in which the fuselage provides the freight storage space and is accessible from the front end for introduction and withdrawal of the lading or ladings.

In connection with an aircraft of the sort referred to, I aim to secure, through structural improvements such as hereinafter more fully disclosed, the uniform distribution of the load weight in the fuselage with a view toward avoiding the transmission of strain or strains to other parts of the plane, and at the same time prevent any unbalance likely to cause manoeuvering difficulties incident to flight.

A further aim of my invention is to provide a simple and reliable releasable means for positionally adjusting and preventing the shifting of a specially constructed cargo support or container within the fuselage during flight of the plane.

My invention is further concerned with facilitating the placement and retraction of an end closure or cover nose for the fuselage, and with the provision of readily releasable multi-unit means automatically operative to lock the closure securely in position incident to its application over the open front end of the fuselage after loading or unloading of the airplane.

Other objects and attendant advantages will appear from the following detailed description of the attached drawings, wherein Fig. 1 is a view in side elevation of a cargo airplane conveniently embodying the present improvements.

Fig. 2 shows the front elevation of the plane.

Fig. 3 is a view in top plan showing how the plane is loaded or unloaded from a platform at a landing field or airport.

Fig. 4 is a fragmentary view on a larger scale showing a vertical longitudinal section of the fuselage.

Figs. 5 and 6 are a horizontal and a cross-section of the fuselage taken as indicated respectively by the angled arrows V—V and VI—VI in Fig. 4.

Fig. 7 is a larger scale fragmentary detail sectional view of the portion within the dash-and-dot rectangle VII in Fig. 4, showing the juncture of the retractable cover nose with the open end of the fuselage and one of the units of the locking means arranged for release by electrical actuation.

Fig. 8 is a cross section of the locking unit taken as indicated by the angled arrows VIII—VIII in Fig. 7.

Fig. 9 is a view corresponding to Fig. 7 showing a modified form of locking unit arranged for mechanical operation.

Fig. 10 is a view in side elevation of a removable support or container for the cargo or freight to be carried in the plane.

Fig. 11 and Fig. 12 respectively show the top plan and a cross section of the support or container.

Figs. 13 and 14 are detail views in plan of two of the components of the support or container.

Fig. 15 is a fragmentary view of a portion of the bottom of the fuselage in longitudinal section showing the means for securing the cargo container against shifting during the flight of the plane.

Figs. 16 and 17 are views corresponding respectively to Figs. 4 and 6 showing an alternative fuselage cover nose construction.

Figs. 18 and 19 are fragmentary sectional views of alternative details to be later described.

The plane illustrated in Figs. 1–3 for convenience of exemplification herein has two powered propelling units 1 mounted on its main or left wing 2 adjacent the forward edge of the latter and respectively to opposite sides of a centrally located fuselage 3 of square cross section which has a retractable cover nose 4, closing its open front end. At the rear end of the fuselage 3 is a tail structure 5 with suitable horizontal and lateral directional flight-controlling vanes 6 and 7, and aft of the storage space within the fuselage is a compartment with an upwardly projecting transparent hood 8 for the plane pilot. For the purposes of loading and unloading, a platform such as indicated at P in Fig. 3 is provided at the landing field or airport, and a tractor T used to insert or withdraw the cargo container, illustrated in Figs. 10–12, into or from the open end of the fuselage 3 after retraction or removal of the cover nose 4.

The wall sheeting 10 of the fuselage 3 (Figs. 4–6) is preferably welded or otherwise fixedly secured to a skeleton framework comprising longitudinaly-spaced ribs 11 of channel section formed from light but strong sheet metal, and suitably spaced longitudinals 12 which are similarly fashioned to channel section from similar metal, and likewise preferably welded to said ribs. Fitted into the open front end of the fuselage 3 in accordance with my invention is a reinforcing ring frame 13 which is of irregular cross section, see Fig. 7, having a horizontal perimetric flange 15 for the support and permanent connection of the wall sheeting 10, a continuous vertical flange 16, and a second horizontal flange 17 which extends forwardly from the flange 16 somewhat inward of the first mentioned horizontal flange 15. From Fig. 7 it will be further noted that a substantial edge margin of the wall sheeting 10 projects beyond the frame 13 and overreaches the flange 17 with resultant formation of a perimetric interspace 18 for the reception of a thickened lip 19 around the edge of the cover nose 4 which may be molded or pressed from plastic material. As shown the lip 19 is rounded as at 21 and tapered for capacity to readily enter the perimetric interspace 18 incident to application of the cover nose 4 which in this instance is completely removable from the fuselage 3. The outer slope 22 of the lip 19 is slight and so arranged as to cause the extended portion of the fuselage shell 10 to be sprung outwardly somewhat as the cover nose 4 is forced home, thereby to insure a weather-tight juncture all around. The inner slope 23 of the nose lip 19 on the cover nose 4 is made somewhat sharper for a reason presently explained.

The means which I have devised for securing the cover nose 4 in place comprises a plurality of locking units 25 which are located at intervals around the ring frame 13, one of them being illustrated to the best advantage in Figs. 7 and 8. As shown, each such locking unit has a cylindric housing 26 which is closed at one end and threaded externally of its open end as at 27 for securement within a tapped hole in the flange 17 of the ring frame 13. Guided for axial movement in the open end of the housing 26 is a latch-bolt 28 which is yieldingly urged outward by a helical compression spring 29. The extent of protrusion of the latch-bolt 28 is limited through engagement of a lateral lug or key 30 thereon with one end of a longitudinal slot or keyway 31 internally of the housing 26, the means just described also preventing said bolt from turning in its housing. The outer end of the bolt 28 is roundedly beveled as at 32 toward its inner side 33 (as considered with respect to its position in the assembly) which is slightly inclined toward the bolt axis, to snugly engage within a correspondingly-configured notch 35 in the edge lip 19 on the cover nose 4. Attention is directed to the fact that the thread at 27 is tapered and so arranged that when screwed home, a circumferential position will be determined for the housing such that the slot 31 will be definitely located, as shown, with the bolt 28 accurately coordinated with the notch 35. Incident to entry of the lip 19 into the perimetric interspace 18 as the cover nose 4 is applied, the relatively sharp slope 23 will coact by camming action with the rounded bevel 32 of the bolt 28 and depress the latter until said notch becomes aligned therewith, whereupon said bolt will be immediately forced outward into locking position by its spring 29. The same action will, of course, concurrently take place in the other locking units 25 around the frame 13, the locking of the cover nose 4 to the fuselage thus taking place automatically as said nose is applied. In this connection it is to be observed that through reaction of the slightly inclined surfaces 33 of the bolts 28 of the several units 25 with the correspondingly sloped surfaces of the notches 35, the cover nose 4 is urged inwardly toward its final closed position and there securely held against the possibility of becoming detached during flight of the plane. Ordinarily eight of the units 25 suitably allocated around the frame 13 will suffice for securing a completely detachable cover nose 4. The number may, however, be varied depending upon the size of the fuselage 3. Disposed within the bottom of the housing 26 of each locking device 25 is a solenoid-coil 36 which upon being energized, by influence upon the reduced axial armature stem 37 of the bolt 28, will overcome the force of the spring 29 and withdraw said bolt from the notch 35 in the lip 19 of the cover nose 4, the leads 38 from said coil passing outward through insulation-bushed holes 39 in the base of the housing 26. In practice I interpose the solenoid-coils 36 of the several locking units 25 in a single energizing circuit with a control switch, which latter may be located at any convenient point on the plane, as for example in the control compartment for the pilot. Thus with the arrangement just described, the bolts 28 of the several locking units 25 may be simultaneously actuated to release the cover nose 4 for ready withdrawal. In the event of failure of the solenoid 36 in any of the units 25, the bolt 28 may be depressed by means of a rod, or other similar instrument or tool, inserted into registering apertures such as shown at 40 in the extended portion of the fuselage sheeting 10 and in the lip 19 of the cover nose 4.

The alternative form of locking device illustrated in Fig. 9, is devoid of a solenoid, and arranged solely for mechanical retraction. Instead its bolt 28a is provided with a transverse bore 41 in which an outwardly spring-pressed plunger 42 is lodged, said plunger being adapted to enter a hole 43 in the side wall of the housing 26a of the unit 25a when the plunger 42 is depressed by a rod or instrument thrust through the aperture 40 to releasably hold said plunger in retracted position. Retainment of the plunger 42 is insured by a disk 44 which closes the hole 43 and which has a smaller central aperture for insertion of another suitable rod or tool to depress the plunger 42 for subsequent release of the bolt 28a to the action of its spring 29a preparatory to the application of the cover nose 4 to the fuselage 3. In all other respects the alternative locking device of Fig. 9 is identical with that of Fig. 7, wherefore, in order to preclude the necessity for repetitive description, all similar parts have been designated by the same reference numerals, previously employed, except for the addition of the letter "a" in each instance for the purposes of more ready distinction.

In the modified embodiment of my invention illustrated in Figs. 16 and 17, the cover nose 4b is hingedly connected along its top edge as at 45 to the reinforcing ring frame 13b at the open end of the fuselage 3b so as to be swingable upwardly out of the way when access is to be had to the fuselage 3b for loading or unloading. In this instance the plane of closure between the fuselage 3b and the cover nose 4b is sloped slightly to the vertical in a direction forwardly from top to bottom, the lip 19b of said cover nose being arranged to overlap the horizontally protruding perimetric flange 17b of the reinforcing ring frame 13b at the entrance into the fuselage 3b. The locking units indicated at 25b and suitably spaced along the sides and the bottom portion of the frame 13b may be of either of the forms shown in Figs. 7 and 9.

The provisions which I have made for reception of the cargo and preventing its shifting in the plane during flight include a support in the form of a container which is illustrated in detail in Figs. 10–12 and there comprehensively indicated by the numeral 60. As shown, this container 60 has a bottom in the form of a skid 61 with laterally spaced invert channel-section longitudinals 62 whereof the ends are upturned as at 63 and connected by angle-section cross-members 65, and a plurality of longitudinally spaced tubular intermediate cross-members 66 overlying said longitudinals. In turn overlying the intermediate cross-members 66 is a longitudinally corrugated floor 67. In practice these parts are all fashioned from thin and light, but nevertheless strong, sheet metal and rigidly secured to each other preferably by welding. Disposed at intervals along the longitudinals 62 within the channel hollows of the latter are circumferentially-grooved rollers 68 for engaging track rails 69 (see Figs. 4-6) affixed to a floor sheet 70 of the fuselage 3 which sheet in turn is fixedly secured to and supported by the bottom portions of the ribs 11. The side walls of the container 60 are of open construction, having upper, lower and intermediate channel section longitudinals 71, 72 and 73 rigidly connected by end verticals 75 and braced by diagonals 76, said bottom and intermediate longitudinals having their hollows all facing outwardly. Adjacent its ends and at the center, the bottom longitudinals 72 of the side frames have laterally extending groups of studs 77, see Fig. 13, for engaging into the ends of corresponding tubular cross-members 66 of the skid 61 as shown in Fig. 11. Except for being shorter, the end walls of the container are generally like the side walls in that they have correspondingly-spaced top, bottom and intermediate longitudinals 78, 79 and 80 as well as bracing diagonals 81. In addition, the end walls are provided with lateral projections 82, see Fig. 14, arranged to engage into the ends of the channel hollows of the side frame longitudinals 71—73, removable pins 83 passed through registering apertures in said projections and said longitudinals serving to unite the end frames to the side frames and to keep the studs 77 on the latter engaged in the ends of the tubular cross-members 66 of the skid 61. By reason of the close spacing of the cross members 66 and the use of numerous rollers 68 along the length of the skid 61, the weight of the load will be uniformly distributed on the bottom of the fuselage 3 with consequent avoidance of the impartation of concentrated strains to other parts of the airplane structure. Due to its unique construction, the height of the skid 61 is kept at a minimum and it therefore takes up but a negligible amount of room. The dimensions of the container 60 are such that it has but very slight side and end clearances within the cargo compartment of the fuselage 3, and moreover since its walls are relatively thin, substantially the entire capacity of said compartment is available for the ladings. As shown in Fig. 3 the container 60 may be connected by a suitable coupling such as diagrammatically indicated at C, Fig. 3, for introduction or withdrawal into or from the fuselage 3 of the airplane by the tractor T, it being understood that the platform P is at the level of the tracks 69 in said fuselage.

Shifting of the container 60 is prevented during flight by the hold-down means illustrated in Fig. 15, said means including eye-bolts 85 and 86 which are pivotally connected to lugs 87 and 88 at the front and rear ends of the skid bottom 61 of said container, and which eye-bolts are respectively provided with wing nuts 89 and 90. The bolts 85 are arranged for engaging notches in an upstanding anchorage lug 91 rigidly secured over the edge of the lower portion of the flange 16 of the reinforcing ring frame 13 at the open end of the fuselage 3, said anchorage lug being formed with an offset 92 which by cooperation with the wing-nuts 89, when the latter are drawn up tight, will prevent the bolts 85 from accidentally rising out of said notches. To the bottom or floor-supporting portion of one of the ribs 11 of the fuselage 3 at the inner end of the cargo space is similarly secured an anchorage lug 93 with notches to receive the shanks of the eye-bolts 86 and with an offset 94 to prevent accidental upward displacement of said bolts after the wing-nuts 90 have been drawn up tight.

For less than full capacity loads to be delivered at different destinations, I provide smaller auxiliary receptacles 95 of standardized dimensions such as indicated in full lines in Fig. 10 and in dot-and-dash lines in Fig. 11 which collectively fill the container 60 completely so as to be immune against subsequent shifting. When such auxiliary receptacles are used, they are initially arranged in the container in accordance with their individual weights so that the specific gravity center of the load is properly disposed for maintenance of equilibrium of the plane in flight. Likewise, if necessary, the auxiliary receptacles are rearranged after each delivery for a like purpose.

In Figs. 18 and 19, I have shown two alternative forms of track rails for the skid bottom 61 of the container 60 either of which may, if desired or found more convenient, be used in lieu of the type hereinbefore described. The track rail 69c has a V-groove designed to receive and retain flangeless rollers 68c on the cargo container. The track rail 69d of Fig. 19, on the other hand, has a rounded groove for reception and retainment of a graphited or otherwise lubricated longitudinal runner 68d at the bottom of the container skid.

Having thus described my invention, I claim:

1. An airplane of the character described having a fuselage which is open at one end to permit introduction and withdrawal of cargo, and which is provided with enveloping wall sheeting; a reinforcing ring frame disposed somewhat inward of the open end of the fuselage and provided with an outwardly-projecting ring flange spaced from the overreaching end of the wall sheeting; a retractable cover nose with a perimetric lip portion adapted to enter the perimetric space between the overreaching edge portion of the fuselage wall sheeting and the flange of the ring frame, said lip portion having its outer surface sloped somewhat to act with a slight wedging action upon the fuselage wall sheeting as the cover nose is applied for the purposes of a weather-tight seal; and means for releasably securing the cover nose to the fuselage.

2. An airplane having a fuselage with an opening at one end for reception or withdrawal of cargo; a retractable cover nose having a lip around its edge for engaging over a perimetric flange projection at the open end of the fuselage; locking means including a plurality of locking units with outwardly spring-biased latch bolts arranged at intervals around said flange projection; cam surfaces on the lip of the cover nose for depressing the bolts as said cover nose is applied; and with notches in said lip into which said bolts automatically engage when said cover nose attains its final closed position.

3. An airplane having a fuselage with an opening at one end for reception or withdrawal of cargo; a retractable cover nose having a lip around its edge for engaging over a perimetric flange projection at the open end of the fuselage; locking means including a plurality of locking units with outwardly spring-biased latch bolts arranged at intervals around said flange projection; cam surfaces on the lip of the cover nose for depressing the bolts as said cover nose is applied; notches in said lip into which said bolts automatically engage when said cover nose attains its final closed position; and means constructed and arranged to simultaneously withdraw the bolts of the several locking devices when it is desired to retract the cover nose.

4. An airplane having a fuselage with an opening at one end for reception or withdrawal of cargo; a retractable cover nose having a lip around its edge for engaging over a perimetric flange projection at the open end of the fuselage; locking means including a plurality of locking units with outwardly spring-biased latch bolts arranged at intervals around the flange projection aforesaid; cam surfaces on the lip of the cover nose for depressing the bolts as said cover nose is applied; notches in said lip into which said bolts automatically engage when said cover nose attains its final closed postion; and electromagnetic means operative upon being energized to withdraw the bolts of the several locking units to permit retraction of the cover nose.

5. An airplane having a fuselage with an opening at one end for reception or withdrawal of cargo; a retractable cover nose having a lip around its edge for engaging over a perimetric flange projection at the open end of the fuselage; locking means including a plurality of locking units with outwardly spring-biased latch bolts arranged at intervals around the flange projection aforesaid; cam surfaces on the lip of the cover nose for depressing the bolts as said cover nose is applied; notches in said lip into which said bolts automatically engage when said cover nose attains its final closed position; and holes extending through the lip of said nose to the individual notches for insertion of a rod or the like to inwardly displace the bolts when it is desired to retract said nose.

6. An airplane having a fuselage with an opening at one end for reception or withdrawal of cargo; a retractable cover nose having a lip around its edge for engaging over a perimetric flange projection at the open end of the fuselage; locking means including a plurality of locking units with outwardly spring-biased latch bolts arranged at intervals around said flange projection; cam surfaces on the lip of the cover nose for depressing the bolts as said cover nose is applied; notches in said lip into which said bolts automatically engage when said cover nose attains its final closed position; holes extending through the lip of the cover nose to the individual notches for insertion of a rod or the like to inwardly displace the bolts when it is desired to retract said nose; and releasable means automatically operable as the bolts are depressed to hold them retracted.

7. An airplane having a fuselage with an opening at one end for reception or withdrawal of cargo; a retractable cover nose having a lip around its edge for engaging over a perimetric flange projection at the open end of the fuselage; locking means including a plurality of locking units with outwardly spring-biased latch bolts arranged at intervals around said flange projection; cam surfaces on the lip of the cover nose for depressing the bolts as said cover nose is applied; notches in said lip into which said bolts automatically engage when said cover nose attains its final closed position; holes extending through said lip to the individual notches for insertion of a rod or the like to inwardly displace the bolts when it is desired to retract said nose; individual housings enclosing the bolts and outwardly spring-biased plungers disposed in a transverse bore in each bolt; and a lateral hole in each housing into which the plunger engages when the corresponding bolt is depressed to temporarily so hold such bolt until the cover nose is retracted, and through which a rod may be inserted to depress said plunger for release of said bolt.

8. An airplane having a fuselage open at one end for introduction and withdrawal of cargo; laterally spaced track rails on the floor of the fuselage for guiding a cargo supporting skid and preventing its subsequent sidewise displacement within the fuselage, said skid including a number of spaced longitudinals with means thereon for engaging the rails, a series of spaced cross members secured to the longitudinals, and a floor of sheet material supported on said cross members; a hold down means for anchoring the skid against shifting after it is finally positioned in the plane comprising I-bolts pivotally connected to the endmost cross members of the skid, and upstanding lugs at the floor of the fuselage at the opposite ends of the cargo space providing notches for reception of the swinging ends of the I-bolt shanks and abutment surfaces for the draw up nuts on the bolt shanks.

9. An airplane having a fuselage open at one end for introduction and withdrawal of the cargo; laterally-spaced track rails on the floor of the fuselage for guiding a cargo supporting skid and preventing its subsequent displacement sidewise within the fuselage, said skid including a number of spaced longitudinals with means thereon for engaging the rails, a series of spaced cross members secured to the longitudinals, and a floor of sheet material supported on said cross members; and a cargo container of which the skid constitutes the bottom and which comprises side wall components with laterally projecting studs along their lower edges for engaging into the ends of the cross members of the skid, end wall components with lateral side wall projections at intervals of their height for engaging over the ends of the side wall components, and means for releasably securing the end wall components to the side wall components at the region of overlap of said lateral projections; and hold down means for anchoring the skid against shifting after it is finally positioned in the plane.

10. An airplane having a fuselage open at one end for introduction and withdrawal of cargo; longitudinally extending track rails on the floor of the fuselage for guiding a cargo supporting skid and preventing its subsequent displacement laterally within the fuselage, said skid including a number of spaced longitudinals with means thereon for engaging the rails, a series of spaced cross members secured to the longitudinals, and a floor of sheet material supported on said cross members; a cargo container whereof the skid constitutes the bottom and which comprises vertically spaced outwardly-open longitudinals and connecting end uprights, the lowermost longitudinals of said side components having laterally projecting studs engageable into the ends of the cross members, end wall components with lateral side wall projections engageable into the hollows of the longitudinals of the side frame components, and pins passed through registering vertical apertures in said lateral projections and in the longitudinals of the side components to detachably secure said side and end components; and hold down means for anchoring the skid against shifting after it is finally positioned in the plane.

ALANSON O. TAYLOR.

REFERENCES CITED

The following references are of record in the file of this patent:

UNITED STATES PATENTS

| Number | Name | Date |
|---|---|---|
| 1,122,686 | Clark | Dec. 29, 1914 |
| 1,747,824 | Collison | Jan. 28, 1930 |
| 1,860,076 | Collison | May 24, 1932 |
| 1,883,538 | Bywater | Oct. 18, 1932 |
| 1,992,941 | Fowler | Mar. 5, 1935 |
| 2,144,410 | Ludington | Jan. 17, 1939 |
| 2,268,009 | Babb et al. | Dec. 30, 1941 |
| 2,323,279 | Van Zelm | June 29, 1943 |
| 2,334,124 | Peterson | Nov. 9, 1943 |
| 2,367,538 | Sullivan | Jan. 16, 1945 |

FOREIGN PATENTS

| Number | Country | Date |
|---|---|---|
| 167,068 | Great Britain | Aug. 4, 1921 |